United States Patent [19]

Wright, Jr. et al.

[11] 4,185,720
[45] Jan. 29, 1980

[54] ADJUSTABLE LOCKING STRUT

[75] Inventors: William S. Wright, Jr., Corona Del Mar; Elmer C. Yang, Orange, both of Calif.

[73] Assignee: Pacific Scientific Company, City of Commerce, Calif.

[21] Appl. No.: 829,834

[22] Filed: Sep. 1, 1977

Related U.S. Application Data

[63] Continuation of Ser. No. 695,223, Jun. 11, 1976, abandoned.

[51] Int. Cl.² .............................................. F16F 7/04
[52] U.S. Cl. .............................. 188/134; 74/424.8 R; 74/424.8 B; 188/1 B; 248/59; 248/DIG. 1
[58] Field of Search .............. 188/1 R, 1 B, 129, 134, 188/189; 248/54 CS, 58, 59, 317, DIG. 1; 74/424.8 R, 424.8 B; 267/9 R, 9 C

[56] References Cited

U.S. PATENT DOCUMENTS

| | | | |
|---|---|---|---|
| 1,054,057 | 2/1913 | Trufant | 188/129 |
| 2,471,857 | 5/1949 | Bleakney et al. | 188/1 B |
| 2,791,129 | 5/1957 | Russell | 74/424.8 B |
| 3,059,727 | 10/1962 | Fuchs | 267/9 C |
| 3,762,227 | 10/1973 | Bohnhoff | 74/424.8 R |
| 3,876,040 | 4/1975 | Yang | 188/1 B |
| 3,983,965 | 10/1976 | Wright | 188/1 B |
| 4,054,186 | 10/1977 | Banks et al. | 188/1 B |

FOREIGN PATENT DOCUMENTS 570535  5/1924  France ............................ 188/129

Primary Examiner—Edward R. Kazenske
Attorney, Agent, or Firm—Knobbe, Martens, Olson, Hubbard & Bear

[57] ABSTRACT

An adjustable locking strut is connected to a pair of relatively movable mechanical elements and permits relative motion between these elements below a predetermined motion threshold. Above this predetermined motion threshold relative movement between mechanical elements is prohibited through the engagement of nonoverhauling threaded members connected to the mechanical elements. These nonoverhauling threaded members are specially designed so that when synchronized they do not engage one another. One of the nonoverhauling threaded members which is internally threaded forms a relatively large tubular inertia mass for sensing accelerated movement between the relatively movable mechanical elements. This tubular inertia mass is machined to close tolerances to fit within a cylindrical cavity in the adjustable locking strut so that when the nonoverhauling threaded members are engaged, extremely large forces may be absorbed by the locking strut without damage thereto, there being no roller or ball bearings in the direct force path to cause system failure.

24 Claims, 11 Drawing Figures

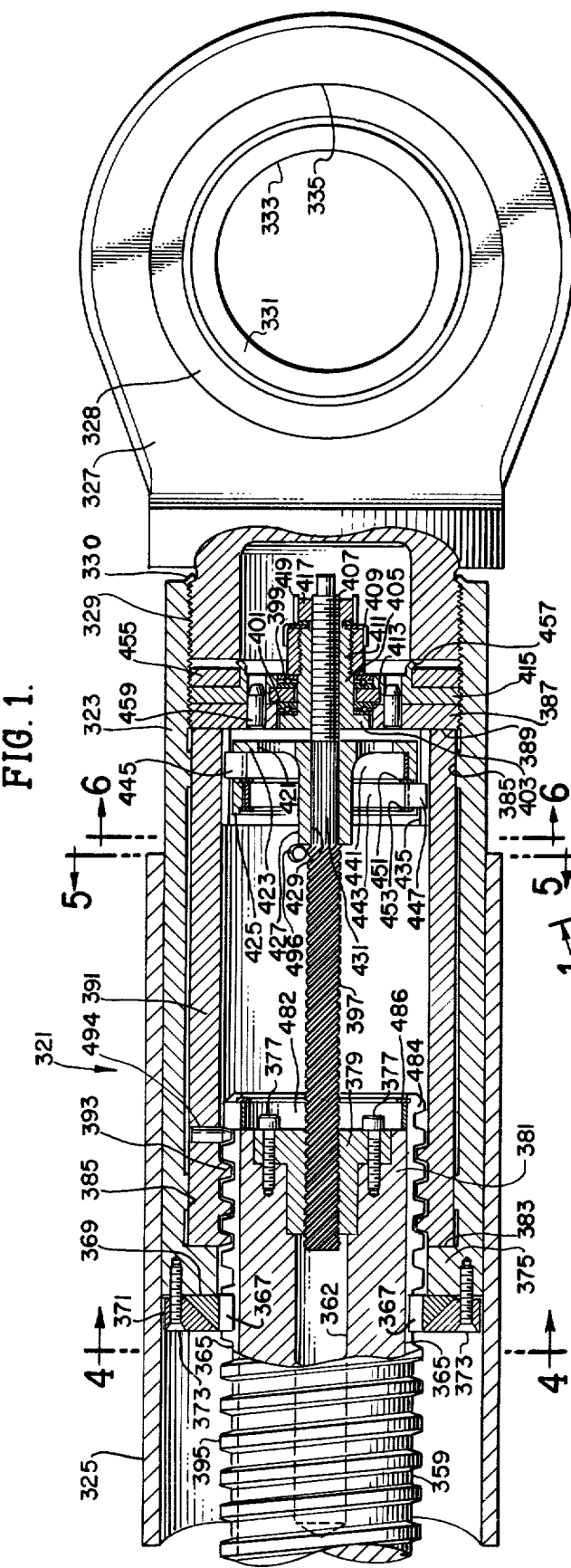
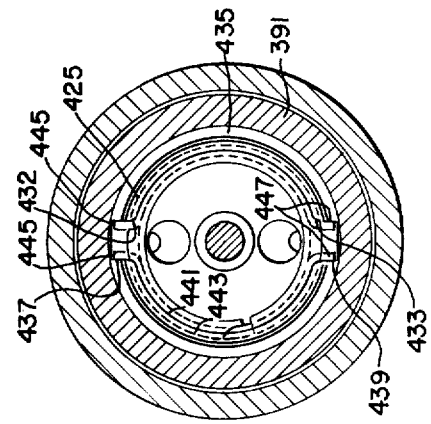
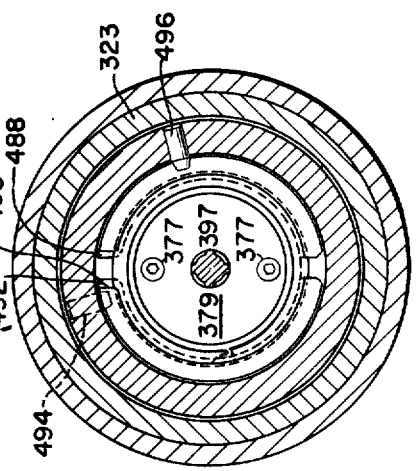
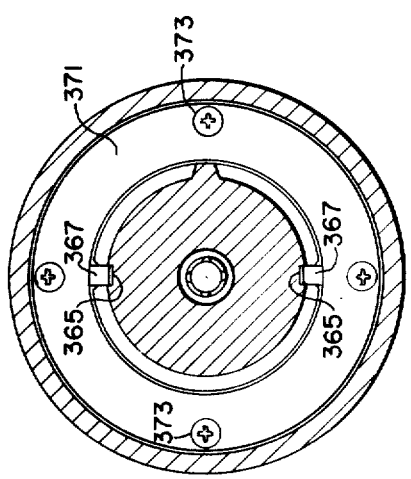

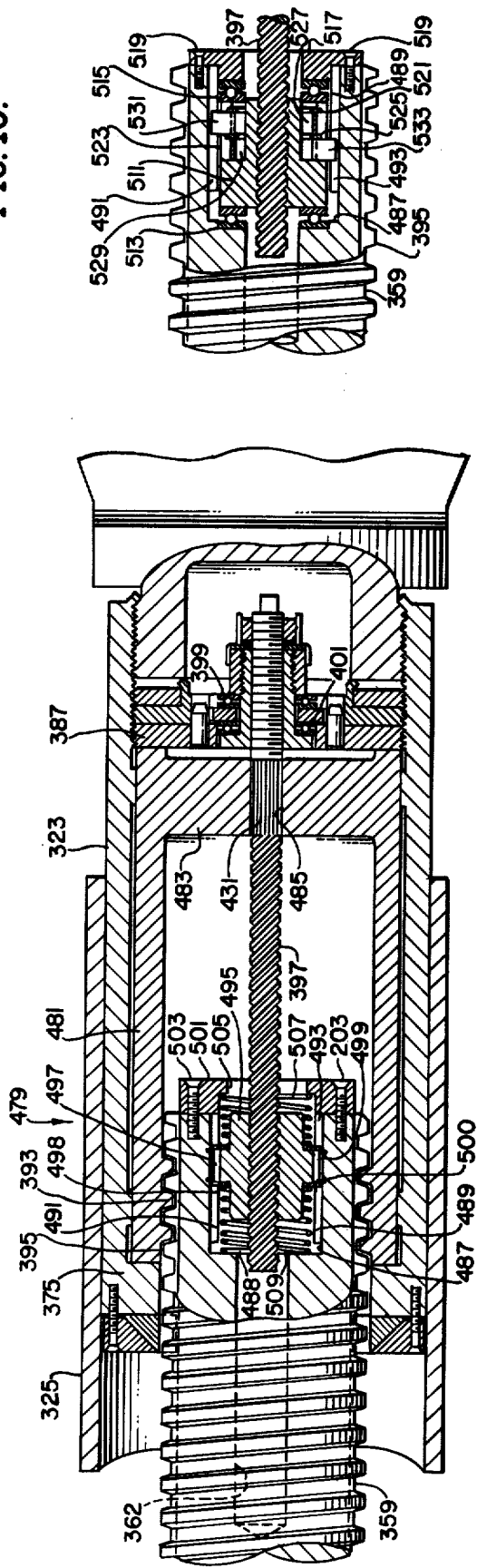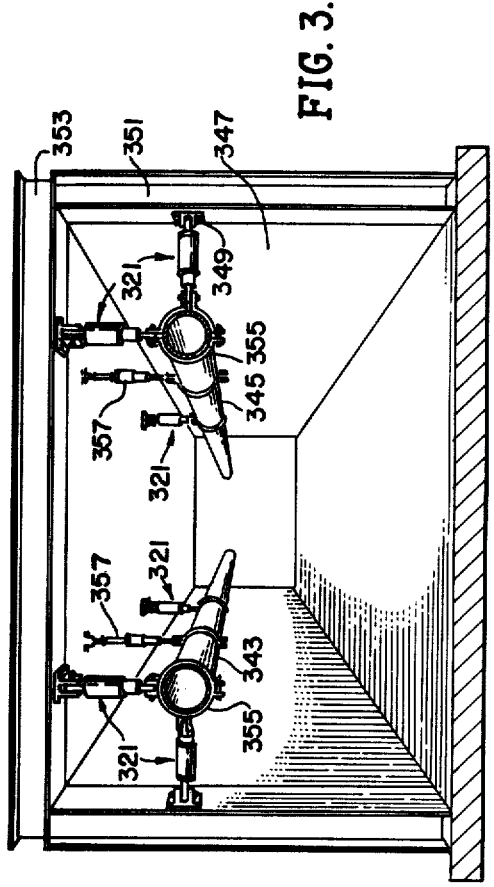

ADJUSTABLE LOCKING STRUT

This is a continuation, of application Ser. No. 695,223, filed June 11, 1976 now abandoned.

BACKGROUND OF THE INVENTION

This invention relates to motion controlling struts or vibration arrestors and, more particularly, to a strut which may be connected between relatively movable elements such as steam pipes in a power producing station and adjacent supporting structure to limit motion between the steam pipe and the structure or any pair of relatively movable mechanical elements. The prior art discloses a diverse assortment of approaches to various motion arresting problems. In particular, many attempts have been made in the prior art to arrest the motion between piping systems in thermal power plants and between various components of artillery pieces, for example, to limit the recoil of such apparatus.

Initially, it will be understood by those skilled in the art that mechanical motion arrestors are recognized as having application in certain installations where hydraulic shock absorbing systems are unsatisfactory. Thus, for example, in nuclear electrical generating facilities where radiation levels are relatively high, hydraulic shock absorbers which are subject to leakage, particularly in the presence of high temperatures, are unsatisfactory for long term usage. Thus, if shock arrestors are positioned in a nuclear generating facility to provide rigid support for piping and other elements in the event of an earthquake or pipe rupture, these devices must be expected to remain in a standby mode, permitting thermal expansion and contraction at low velocity and acceleration rates of the piping and other elements, possibly for years, and still be suitable to arrest shocks which would occur during an earthquake. In such installations, hydraulic shock absorbers do not provide the long term stability which is required.

Most prior art dry mechanical arrestor devices include an overhauling head screw which is rotationally and axially fixed to one of the movable elements. Such lead screws are typically used to rotationally drive an axially spring centered braking device which, under normal circumstances, is centered axially between a pair of braking surfaces. These braking devices engage one of the braking surfaces as the motion parameter, typically acceleration, is increased. The primary difficulty which has been encountered with devices of this type is the fact that the entire load which is to be supported by the motion arrestor must be borne by the overhauling threaded member, even under circumstances where the braking mechanism is engaged. This constraint severely limits construction of the overhauling threaded member and also limits the load which may be supported by the motion arrestor. Some attempts which have been made to remove the overhauling threaded member from the main load bearing assembly have resulted in devices which are extremely complex in construction and utilize a spring centered braking arrangement which is itself subject to failure under mechanical stress.

The most effective dry mechanical motion arrestors which have been developed in the prior art are described in detail in U.S. Pat. No. 3,876,040 and U.S. Pat. No. 3,983,965, each of which is assigned to the assignee of the present invention. The first of these systems provides an extremely effective mechanism for monitoring acceleration of the relatively movable mechanical members and permits continued motion of the mechanical elements in the presence of extremely large forces, the motion being limited once an acceleration threshold has been reached. This mechanism, however, bears the primary load through an overhauling lead screw and is therefore limited in regard to the amount of force which can be arrested by a mechanism of predetermined size. The second of these inventions is similar in many respects to the present patent application, that device incorporating synchronized nonoverhauling threaded members which are designed to interengage without contact when axially and rotationally synchronized. Since the overall operation of that previous device is similar to the operation of the present device, the disclosure in the previously filed U.S. Pat. No. 3,983,965 is incorporated in this application by reference. One difficulty encountered with this device, however, is the requirement that the force borne by the locking strut through the nonoverhauling threads must be borne by roller bearings or ball bearings used to support one of the nonoverhauling threaded members in a fixed axial but freely rotating position within the locking strut. These bearings produce stress concentrations within the locking strut which form the weakest link in the shock arrestor structure and thus limit the ultimate strength of the locking strut.

Another difficulty encountered with this device is the fact that the spring used to sense the acceleration or velocity responds to friction in the overhauling screw-nut combination as though it were an inertia force presented by the inertia mass. This response interferes with precise calibration of the motion threshold.

SUMMARY OF THE INVENTION

The present invention permits the manufacture of a motion arresting device which may be subjected to extremely high mechanical forces without damage to the arrestor but which nevertheless permits simplicity of design and construction, thereby increasing both the dependability and cost efficiency of the arrestor device.

The structure which permits these desirable characteristics includes a pair of nonoverhauling threaded members which are specially designed to interengage without contact when axially synchronized. One of these nonoverhauling threaded elements is rigidly connected to one of the relatively movable mechanical elements. The other nonoverhauling threaded member is machined to close tolerances for receipt within a cooperating, mating enclosure attached to the remaining relatively movable mechanical element. This second nonoverhauling threaded member is free to rotate within the cooperating enclosure but is not mounted on any stress concentrating bearings. Thus, when the nonoverhauling threaded members engage, the force from one relatively movable mechanical element to the other is borne directly by the cooperating enclosure and the pair of nonoverhauling threaded members without the interposition of bearing elements.

As with the prior patent application, an overhauling threaded element is connected between the pair of relatively movable members to convert linear motion into a rotary motion of one of the nonoverhauling threaded members to synchronize the nonoverhauling threaded members during relatively low velocity or acceleration movement. When a predetermined force is applied to the overhauling threaded member, either this member or an overhauling nut into which it is threaded will move either axially or rotationally so that synchronism can no longer be maintained between the nonoverhauling threaded members, and these members engage to prohibit further relative motion between the mechanical elements.

Thus, in this device, not only do the nonoverhauling threaded members directly support the forces causing excessive motion between the relatively moving mechanical elements without the intervention of the overhauling lead screw, but also the rotating overhauling threaded member used as an inertia mass is mounted for rotation within the motion arrestor in a manner which prohibits force concentrations as would occur, for example, if roller or ball bearings were used for mounting, so that extremely high forces may be supported by this arrestor. In addition, the overall simplicity of the present design permits a compact, relatively inexpensive, arrestor to support extremely large forces without damage to the arrestor, all while permitting extremely long standby life without maintenance for the arrestor, facilitating its use in nuclear generating facilities.

In addition, the present invention permits the placement of the motion sensing spring between the driven member of the overhauling screw-nut combination and the inertia mass, so that only inertia forces are sensed by the spring. This permits an extremely precise calibration of the motion threshold of the strut.

These and other advantages of the present invention are best understood through a reference to the drawings, in which:

FIGS. 1 and 2 are opposite ends, respectively, of the motion arrestor of the present invention, shown in a partial longitudinal sectional view through the center of the apparatus;

FIG. 3 is a perspective view showing motion arrestors in accordance with the present invention used for stabilizing piping within a nuclear reactor facility;

FIG. 4 is a sectional view taken along lines 4—4 of FIG. 1;

FIG. 5 is a sectional view taken along lines 5—5 of FIG. 1 and showing the section lines for the view of FIGS. 1 and 2;

FIG. 6 is a sectional view taken along lines 6—6 of FIG. 1;

FIG. 9 is a partial sectional view similar to the sectional view of FIG. 1 showing a second alternate embodiment of the present invention; and FIG. 10 is a partial sectional view of the overhauling threaded interconnection portion of a third alternate embodiment of the present invention.

DETAILED DESCRIPTION OF THE PREFERRED EMBODIMENT

Figure 2:
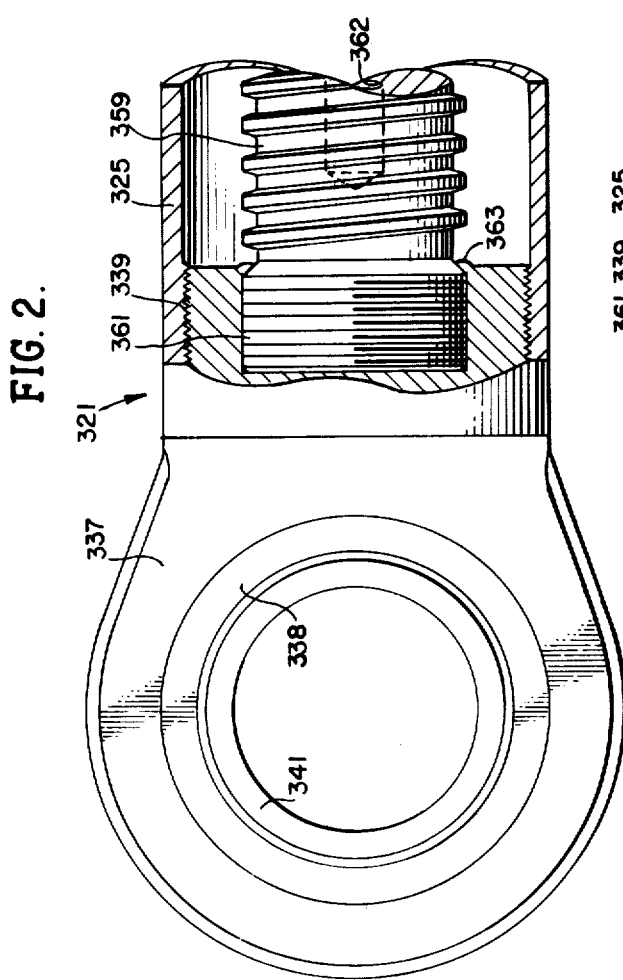

Referring initially to FIGS. 1 and 2, the adjustable locking strut or motion arrestor 321 of the present invention is shown to include a first telescoping member 323 and a second telescoping member 325. The engaging surfaces of these members are machined to a close tolerance to slidingly receive one another and to thereby maintain the axial alignment of the entire locking strut 321.

The first telescoping member 323 is rigidly interconnected with an end cap 327, as by threads 329 which are end crimped at 330 to prohibit unthreading after the unit is assembled. It will be appreciated that the primary forces controlled by the locking strut 321 must be borne by the threaded interconnection 329, and this interconnection should be designed to substantially exceed the maximum force which will be applied to the unit.

The end cap 327 includes a spherical bearing 328 housing a spherical pillow block 331 including a cylindrical bore 333. The spherical bearing 328 is fitted into a cylindrical bore 335 in the end cap 327 and permanently affixed within this bore 335. The pillow block 331 is free to rotate to a limited degree within the spherical bearing 328 to facilitate mounting of the end cap 327 on a first relatively movable member, such as a yoke or other support member which includes a rod conforming to the bore 333.

The second telescoping member 325 is similarly connected to a second end cap 337 by the threads 339 which are crimped in a manner similar to the crimping 330. This second end cap 337 may be identical to the end cap 327, including a spherical bearing 339 and rotating pillow block 341 for mounting the second telescoping member 325 to a second relatively movable member. It should be understood that the motion between the end caps 327 and 337 follows the motion of two relatively movable objects to which these end caps 327, 337 are attached, and it is this motion which the locking strut 321 of the present application is designed to control.

Thus, for example, referring temporarily to FIG. 3, six locking struts 321 in accordance with the present invention are shown connected between a pair of high pressure steam pipes 343 and 345 and a chamber 347 of a nuclear generating facility. A first end, typically the end connected to the telescoping member 325 of each of these struts 321, is journalled on a mounting yoke 349 which may be attached, for example, to wall and ceiling steel girders 351 and 353 of the enclosure 347, as by welding. The remaining telescoping member 323 is connected through its end cap to a pipe clamp 355 rigidly attached to the pipes 343, 345. These locking struts 321 do not themselves support the pipes 343, 345 during normal operation. Rather, a pair of spring supports 357 are used for this purpose. These spring supports 357 suspend the pipes 343, 345 and permit a degree of movement of the pipes 343, 345 consistent with the thermal expansion of the pipes as they are heated and cooled. The locking struts 321 also operate to permit relatively slow thermal movement of the pipes 343, 345, but are designed to become rigid struts in the event of violent vibrations as would occur, for example, during an earthquake or rupture of one of the pipes 343, 345. Thus, the locking struts 321 are not intended to play a significant role in the support or positioning of the pipes 343 and 345 during normal operation, but are only to effect pipe position in the event of vibrations which would cause damage to the pipes 343, 345 themselves or to the enclosure 347. As will be appreciated from the remaining disclosure in this application, the present locking strut 321 provides relatively free movement of the pipes 343 and 345 at low acceleration rates. Once an acceleration threshold has been reached by the application of excessive forces to the pipes 343, 345 or support pillars 351, 353, however, the locking struts 321 will become rigid supports for the pipes 343, 345 maintaining their position relative the beams 351, 353.

Referring again to FIGS. 1 and 2, it should be noted that the motion arrestor 321, in addition to connection with a pipe flange as shown in FIG. 3, may be used in a wide variety of applications. In particular, it is useful in any apparatus where relative motion between two objects is to be permitted below a predetermined acceleration or velocity threshold (motion threshold) but is to be prohibited above this motion threshold. For example, the present invention is adaptable as a recoil arrestor in artillery pieces. Such motion arrestors permit movement or adjustment of the artillery piece at relatively slow speeds but prohibit motion between the artillery piece and its mounting base when the piece is fired by sensing velocity or acceleration above a predetermined threshold.

The end cap 337, in addition to its rigid interconnection with the telescoping member 325, is rigidly interconnected with a first nonoverhauling threaded member 359, this member being mounted coaxially within the telescoping member 325 and attached, as by a threaded interconnection 361, to the end cap 337. The threads 361 may be crimped over or welded, as at 363, to prevent any axial or rotary relative movement between the nonoverhauling threaded member 359 and the end cap 337. The threaded interconnection permits precise alignment of the axes of the telescoping member 325 and the first nonoverhauling threaded member 359, as is necessary for proper operation of the arrestor 321. Throughout a substantial portion of the length of the nonoverhauling threaded member 359, this member is formed as a tube having a central aperture 362 for receipt of an overhauling threaded member, as will be described in detail below. As used in the present disclosure, nonoverhauling threads are threads which will not induce rotary motion in response to axial forces, while overhauling threads are threads which will induce such rotary motion in response to axial forces.

This first nonoverhauling threaded member 359 includes plural axially extending keyways 365, best seen in FIGS. 1 and 4. These keyways 365 receive plural keys 367 projecting unitarily radially inward from an annular ring 369 which has a triangular cross section. This triangular cross section is designed to conform with the trapezoidal cross section of a second annular member 371 surrounding the annular member 369 and used to clamp the annular member 369 and its keys 367 in a desired rotational orientation. Plural screws 373 are used to clamp the annular ring 371 against the annular ring 369, forcing the annular ring 369 into frictional engagement with an enlarged end 375 of the first telescoping member 323. The interengagement of the keys 367 and keyways 365 prohibits relative rotation between the first nonoverhauling threaded member 359 (and attached second telescoping member 325) and the triangular annular member 369. By tightly clamping this annular member 369 against the end of the first telescoping member 323, a predetermined degree of friction may be introduced to prohibit relative rotation between the first telescoping member 323 and the first nonoverhauling threaded member 359. Since, as previously explained, both the first nonoverhauling threaded member 359 and the second telescoping member 325 are rigidly interengaged with the end cap 337, the screws 373 bearing on the annular ring 371 determine the degree of friction required for relative rotation of the pair of telescoping members 323 and 325. It is desired that the overall locking strut 321 be relatively resistive to rotation between the members 323 and 325, but that during installation in the field, if necessary, the two end caps 327 and 337 should be rotatable through the application of sufficient force at the end caps 327, 337. This permitted rotation is provided through the clockwise rotation of the annular member 369 between the end 375 of the telescoping member 323 and the trapezoidal annular member 371, and the stiffness of the device to counteract such rotation may be adjusted by the screws 373.

As will become clearer through the remaining description, the key to operation of the locking strut 321 is the maintenance of synchronization of nonoverhauling threaded members prior to the application of excessive acceleration. It will become clear also that a rotation of the telescoping members 323 and 325 to adjust these members for installation will not interfere with the synchronization of these threads.

Attached by a pair of screws 377 to the end of the first nonoverhauling threaded member 359 is an overhauling nut 379. This nut is conveniently T-shaped in cross section to conform with a double-shouldered end 381 provided at the unsupported extremity of the nonoverhauling threaded member 359.

The enlarged end 375 of the first telescoping member 323 provides an internal shoulder 383. The remaining length of the first telescoping member 323 has a uniform cylindrical diameter with the exception of a pair of annular bearing surfaces 385. A flat annular nut 387 is threaded onto the threads 329 at the other extremity of the first telescoping member 323 and provides a bearing surface 389. The bearing surfaces 383, 385 and 389 are ground to close tolerances and the nut 387 is accurately positioned within the telescoping member 323 to provide a close tolerance enclosure for a rotating tubular inertia member 391. This inertia member 391 includes at one extremity a reduced inside diameter portion which provides nonoverhauling threads 393 for interengagement with the nonoverhauling threads 395 of the first nonoverhauling threaded member 359. Those exterior portions of the inertia member 391 which abut the bearing surfaces 383, 385 and 389 are highly polished, and sufficient clearance is provided between the bearing surfaces to permit the inertia member 391 to rotate about its own axis within the enclosure provided by the first telescoping member 323 and nut 387, although excessive clearances are avoided since, as will be understood from the description below, it is desired that the inertia member 391 contact either the shoulder 383 or bearing surface 389 without excessive end play.

Figure 7:
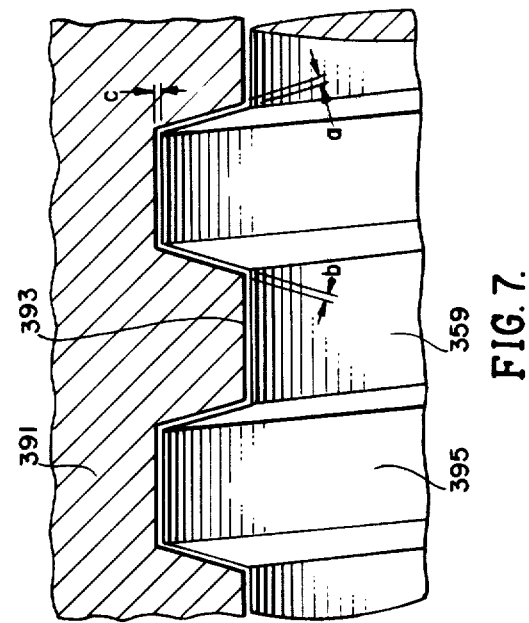
FIG. 7 is a greatly enlarged partial sectional view of the synchronized nonoverhauling threads of FIG. 1.

The nonoverhauling threads 393 and 395 are of special design, as will be best understood through a brief description of FIG. 7. The threads 393 and 395 are machined onto the elements 391 and 359, respectively, to permit the threads to interengage without contacting. As used in this disclosure, interengaged threaded elements, as shown in FIG. 7, are positioned with the crests of the threads of one element positioned between the crests of the threads of the alternate element, but the threads are machined with sufficient clearance so that such interengagement is possible without any thread contact. In order to maintain this clearance, such as the clearances shown at a, b and c in FIG. 7, it is necessary that the inertia member 391 which provides the second nonoverhauling threaded member be both axially and rotationally synchronized with the first nonoverhauling threaded member 359, and it is likewise necessary that the axial alignment of the threaded members 391 and 359 be accurately maintained. Axial alignment, as previously described, is maintained by the interengagement of the telescoping members 323 and 325. Synchronization is accomplished through the use of an overhauling threaded member 397 shown in FIG. 1.

This overhauling threaded member 397 is engaged and contacts the overhauling nut 379 and is maintained in a fixed axial position relative the end cap 327 by a pair of thrust bearings 399 and 401. These thrust bearings 399, 401 are positioned between a shoulder 403 of a nut 405 threaded onto a standard threaded extremity 407 of the overhauling threaded member 397 and a second nut 409 threaded onto a threaded extremity 411 of the nut 405. The nut 409 thus clamps the pair of thrust bearings 399 and 401 about an annular ring 413 which is retained within an annular nut 415 attached by the threads 329 to the first telescoping member 323. A locking nut 417 and locking tabs 419 may be used to prevent unthreading of the nut 409. By adjusting the standard threaded extremity 407 with respect to the nut 409, the clearances a, b of FIG. 7 can be precisely set. Thus, through the threaded extremity 407, nut 405, and bearings 399 and 401, the overhauling threaded member 397 is axially fixed within the telescoping member 323 but free to rotate on the bearings 399 and 401 about its own axis.

Rigidly attached to the overhauling threaded member 397 between the overhauling threaded extension and the standard threaded extremity 407 is a cup-shaped driving member 421 including a flat disc end portion 423 interconnecting a cylindrical cup wall portion 425 and an axial hub member 427. The hub member 427 includes a smooth bore 429 which is pressed onto a splined portion 431 of the overhauling threaded member 397. Interengagement of the splined portion 431 and smooth bore 429 rigidly attaches the cup-shaped member 421 to the overhauling threaded member 397. The cylindrical wall portion 425 of the cup-shaped member 421 includes two diametrically opposed, axially oriented slots 432 and 433, best seen in FIG. 6. The inside diameter of the inertia member 391 includes a reduced diameter shoulder 435 at the end adjacent the cup-shaped member 421. This shoulder 435 includes a pair of slots 437 and 439 which are diametrically opposed, axially aligned with and positioned adjacent the slots 432 and 433, respectively, of the cup-shaped member 421.

A pair of springs 441 and 443, each formed as a partial circular ring terminating at each end in a pair of parallel, outwardly extending tabs 445 and 447, respectively, are positioned within the cup-shaped member 421, with the tabs 445 and 447 extending through the slots 432 and 433, respectively. The first spring 441 is maintained against the bottom wall 423 of the cup-shaped member 421 by a spring clip 451 extending radially outward into a conforming groove within the cylindrical sidewall 425 of the cup-shaped member 421. Similarly, the second spring member 443 is axially positioned between this first spring clip 451 and a second spring clip 453 also conforming and radially sprung into a groove within the cylindrical sidewall 425 of the cup-shaped member 421. The end tabs 445 and 447 of the springs 441 and 443, respectively, extend a sufficient distance in a radial direction to pass not only through the notches 432 and 433 of the cup-shaped member 421 but to also enter the slots 437 and 439, respectively, of the shoulder 435. These springs 441 and 443 therefore tend to lock the cup-shaped member 421 and inertia member 391 against relative rotation.

Each of the springs 441 and 443 has a relaxed diameter which is substantially larger than the diameter to which these members are confined within the cup-shaped member 421, so that in the relaxed position the extending tabs 445 and 447 are separated by a greater distance than in the prestressed configuration shown in FIGS. 1 and 6. Thus, any relative rotation of the cup-shaped member 421 and the inertia member 391 must overcome this preload of the springs 441 and 443. After this preload has been overcome, the springs 441 and 443 will permit relative rotation of the cup-shaped member 421 and inertia member 391 if sufficient radial force is applied, resulting in a drawing of the radial tabs 445 and 447 of each of the springs 441 and 443 toward one another until rotary motion is ultimately prohibited. It will be seen, therefore, that the springs 441 and 443 bias the cup-shaped member 421 and its attached overhauling threaded member 397 toward an aligned rotational position relative the inertia member 391 in both rotational directions.

A locking nut 455 in conjunction with a locking tab 457 and pins 459, maintains the overhauling threaded member 397 in axial alignment. Thus, through the use of the bearings 399 and 401 and the springs 441 and 443, the overhauling threaded member 397 may be synchronized with the nonoverhauling threads 393 of the inertia member 391.

During use of the locking strut 321 of FIGS. 1 through 6, the application of axial forces to the end caps 327 and 337 will be transmitted through the bearings 399 and 401 to the overhauling threaded member 397 and will be likewise transmitted through the nonoverhauling threaded member 359 to the overhauling nut 379. These forces will cause the overhauling threaded member 397 to rotate about its own axis within the first telescoping member 323, rotating, in turn, the inertia member 391 through engagement of the tabs 445 and 447 in the grooves of the cup-shaped member 421 and shoulder 435 of the inertia member 391. So long as these axial forces are relatively low, the preload of the springs 441 and 443 will be sufficient to rotate the inertia member 391 within the enclosure formed by the first telescoping member 323 so that the rotation induced in the inertia member 391 will permit the nonoverhauling threads 393 to thread onto the rotationally fixed nonoverhauling threads 395 of the member 359, these nonoverhauling threads thus remaining interengaged but noncontacting, that is, in synchronism. It is, of course, necessary that the pitch and direction of the overhauling threads 397 be identical with the pitch and direction of the nonoverhauling threads 393 and 395 for this operation to occur. Thus, while the thread pitch is identical, the difference in diameter between the threaded members 379, 397 and the threaded members 391, 359 is sufficient to make one thread combination overhauling while the other thread combination is nonoverhauling. More specifically, typical thread angles of the nonoverhauling threads on elements 359 and 391 is less than 12°, while typical thread angles of the overhauling threads on members 397 and 379 is greater than 18°, this difference in thread angles being the result of identical thread pitch on different diameter shafts. The threads on the members 397 and 379 may be multiple, as shown, if desired. The rotation of the threads 393 by the overhauling threaded member 397 in response to axial forces on the locking strut 321 is opposed by the rotary inertia of the threaded member 391 itself. Thus, as the overhauling threaded member 397 accelerates axially into or out of the cavity 362 within the nonoverhauling threaded member 359, a corresponding rotary acceleration of the inertia member 391 must occur. When a high rotary acceleration motion is imparted to the cup-shaped member 421, the force required to impart this rotary acceleration to the inertia member 391 exceeds the preloading of the springs 441 and 443. This excessive force permits relative rotation between the cup-shaped member 421 and inertia member 391, so that the overhauling threaded member 397 can no longer maintain the synchronism between the threads 393 and 395. The threads 393 and 395 will thus engage and, since they are nonoverhauling, the friction between these threaded members will lock the strut 321 in the position it has achieved at the time of such engagement. As will be noted, the large forces which may now be applied to the locking strut 321 are transmitted directly through the end cap 327, first telescoping member 323, inertia member 391, nonoverhauling threaded member 359, and end cap 337, without the interposition of roller or ball bearings which would cause stress concentrations limiting the force capability of the strut 321. In particular, the overhauling threaded member 397 is removed from the direct load bearing elements in the strut 321. In addition, the large engaging surfaces between the inertia member 391 and either the nut 387 or shoulder 375, depending upon the direction of the force, permits extremely large forces to be supported. During times when the strut 321 is locked in position as just described, the springs 441 and 443 continue to bias the inertia member 391 toward a synchronized position, so that as soon as these excessive forces are removed the inertia member 391 will be rotated by the springs 441 and 443 to a synchronized position, again permitting relatively slow movement between the end caps 327 and 337. It will be appreciated also that the amount of preload of the springs 441 and 443 predetermines an acceleration threshold at which these springs 441, 443 can no longer maintain the synchronism of the nonoverhauling threads 393 and 395. Completely free axial motion is permitted at all accelerations below this threshold level. Once the threshold level has been reached, the strut 321 will become a rigid, locked strut, prohibiting further motion until the forces which produced the excessive acceleration are removed. The device operates identically in both directions and will therefore lock in response to forces generating contraction or extension of the strut 321.

It is an important feature of the embodiment of FIGS. 1 through 6 that the springs 441 and 443 drive only the inertia member 391, so that all frictional forces in the overhauling threaded members 397 and 379 is borne by the bearings 399 and 401. Since the overhauling threaded members 397 and 379 do not affect the operation of the springs 441 and 443, precise calibration of the strut 321 in response to rotary acceleration of member 391 alone is possible.

As previously stated, the tolerances of the enclosure within the first telescoping member 323 which support the rotating inertia member 391 are critical and must permit the member 391 to rotate freely when the threads 393 and 395 are synchronized. However, as soon as the acceleration threshold has been exceeded, the threads 393 and 395 will become engaged and one end of the inertia member 391 must be sufficiently close to its enclosure, formed by the nut 387 or shoulder 375, to permit contact with the enclosure ends to lock the strut 321.

Those skilled in the art will recognize that the strut 321 of FIGS. 1 through 6 is purely acceleration responsive and not subject to velocity constraints. Nevertheless, it will also be recognized that the device may be made velocity sensitive, for example, through the use of centrifugal brakes between the inertia member 391 and first telescoping member 323 such as are shown in the embodiment of FIGS. 12 and 13 of U.S. Pat. No. 3,983,965 incorporated herein by reference. Thus, the device operates to permit axial motion of the strut 321 below a motion threshold but to prohibit further motion if forces are applied to the end caps 327, 337 which would induce motion above this predetermined threshold.

It can now be seen that if, during installation, the end caps 327 and 337 must be rotated relative one another for fitting onto apparatus whose motion is to be controlled, the triangular cross section annular ring 369 may be forced to rotate between the trapezoidal cross section annular member 371 and the end 375 of the first telescoping member 323. This rotation causes a rotation of the nonoverhauling threaded member 359 relative the first telescoping member 323, but will, in turn, cause a rotation of the inertia member 391 by the cup-shaped member 421, since the overhauling threaded member 397 will rotate in conjunction with the nonoverhauling threaded member 359, so that the threads 393 and 395 remain in synchronism even though the end caps are relatively rotated. This is a distinct advantage of the present device, since it is possible to synchronize the nonoverhauling threads 393, 395 during manufacture and to then rotate the end caps 327 and 337 during installation without interfering with the thread synchronization.

While the embodiment of FIGS. 1 through 7 is satisfactory for prohibiting relative motion between the telescoping members 323 and 325 once a predetermined motion threshold has been surpassed, the embodiments of FIGS. 8 through 11 show alterations in the end connections to the overhauling threaded member 397 which permit the overall function of the strut 321 to remain substantially unchanged although the elements used to sense motion threshold are changed.

Figure 8:
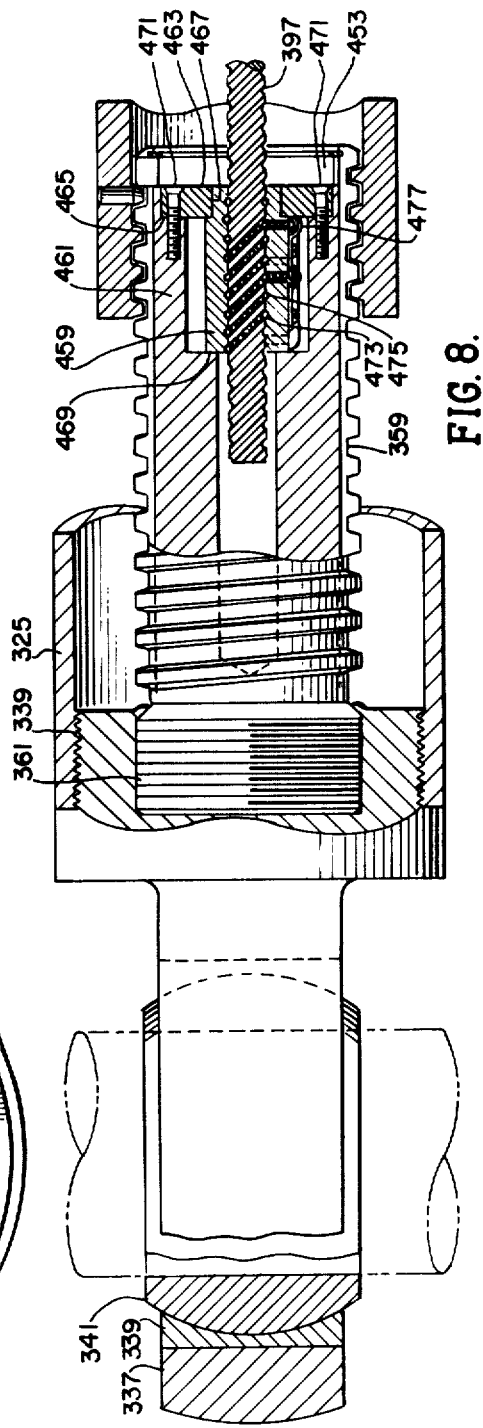
FIG. 8 is a longitudinal sectional view taken through a plane at right angles to the plane of the view of FIG. 1 showing a first alternate embodiment of the present invention.

Initially, FIG. 8 shows a device which is identical in all respects to the device of FIGS. 1 through 7, except that the overhauling nut 379 is replaced with a ball nut 459 which requires alterations in the shouldered end 461 of the first nonoverhauling threaded member 359. The ball nut 459 may be maintained within an increased diameter end portion 461 of the nonoverhauling threaded member 359 by an annular lock ring 463 conforming to a shoulder 465 of the end 461 and a second shoulder 467 in the end of the ballnut 459. The other end of the ballnut 459 seats directly against a shoulder 469 of the end 461. Plural screws 471 may be used to attach the ring 463 and nut 459 into position and to prohibit relative axial or rotational movement between the nut 459 and nonoverhauling threaded member 359. The ball nut 459 serves the same purpose as the overhauling nut 379 of FIG. 1, but reduces the friction generated by the conversion of axial strut forces to rotary motion in the overhauling threaded member 397. Since the overhauling threaded member 397 and ball nut 459, as explained previously, are not required to bear the substantial forces of the strut 321 in a locked configuration, the ball nut 459 may be of relatively delicate construction without concern for the stress concentrations which would be produced if large forces were to be borne. Ball nuts and their operation are well known in the art, and include plural circulating ball bearings 473 which engage between thread slots 475 in the ball nut 459 and the threads of the member 397. These balls also circulate through external channels 477 to permit a continual threading of the members 397 and 459.

While the reduction of friction at the overhauling threaded member 397 and ball nut 459 is not of critical importance in the embodiment of FIGS. 1 through 7, since axial motion of the overhauling threaded member 397 is borne by the thrust bearings 399 and 401, it may be of greater significance in embodiments such as those shown in FIGS. 9 and 11, which will be described below, where the axial force on the overhauling threaded member 397 is sensed to determine the motion threshold.

Referring now to FIG. 9, an alternate embodiment 479 will be disclosed wherein axial desynchronization of the overhauling threads, rather than rotational desynchronization, is used to lock the strut. In this instance, the locking strut includes a first overhauling member 323, second overhauling member 325, first nonoverhauling threaded member 359, bearings 399 and 401 and mounting therefore, all of which are substantially identical to those of the embodiment of FIGS. 1 through 7. In this instance, however, an inertia member 481 is provided which includes a circular end portion 483 including a smooth axial bore 485 which is directly pressed onto, and thus rigidly attached to, the splined portion 431 of the overhauling threaded member 397. In this instance, the machining of the bearing surfaces of the inertia member 481 and the enclosure, particularly the shoulder 375 and nut 387, as well as the positioning of this nut 387, are even more critical than in the embodiment of FIGS. 1 through 7, since the inertia member 481 is locked against axial movement by the bearings 399 and 401. It is thus preferable in this embodiment that enough play be present in the bearings 399 and 401 so that these bearings 399, 401 will normally float the inertia member 481 between the ends 375 and 387 but, without damage to the bearings 399 and 401, the inertia member 481 must be free to contact at its ends the nut 387 or, alternately, the shoulder 375 when the strut 479 is in a locked configuration. This may be accomplished, for example, by placing a resilient mounting (not shown) between the bearings 399 and 401 and the supporting structure, the resilience being preloaded so that greater axial force is required to axially displace the threaded member 397 than is required to displace the motion sensing springs which will be described in detail below.

In this embodiment, the end of the nonoverhauling threaded member 359 includes a cavity 487 including a shouldered end 488 and a reduced diameter shoulder portion 489 including a pair of diametrically opposed slots 491 and 493 extending axially along the cavity 487. An overhauling nut 495 is threaded onto the overhauling threaded member 397 and includes a pair of radially extending tabs 497 and 499 engaged within the slots 491 and 493, respectively. Alternatively, the slots 491, 493 and tabs 497, 499 may be of larger number to form, in effect, a splined interconnection of the nut 495 and cavity 487, which permits axial relative motion of these elements but prohibits relative rotation. An end cap 501 is attached to partially cover the enclosure 487 and is attached to the nonoverhauling threaded member 359 by plural screws 503. The end cap 501 includes a large central bore 505 to permit motion of the overhauling threaded member 397 into the cavity 362. A pair of preloaded springs 507 and 509 fit within the cavity 487 and extend between washers 498 seated against the tabs 497, 499 and the end cap 501 and shoulder 488, respectively. These springs 507 and 509 in their relaxed position have a substantially longer axial dimension than that shown in FIG. 9, but are preloaded into the configuration shown during placement of the end cap 501. These springs thus bias the nut 495 to a central location within the cavity 487, a position which axially synchronizes the nonoverhauling threads 393 and 395. A pair of split rings 500 are fitted within grooves in the cavity 487. These rings 500 engage the washers 498 to permit the preload of the springs 507 and 509 to limit axial movement of the nut 495. Thus, for example, when the nut 495 moves to the left, as viewed in FIG. 9, the ring 500 on the right of the nut 495 will bear the preload of spring 507, so that the entire preload of spring 509 is applied to the nut 495.

During use of this device, the application of axial forces to the arrestor 479 will be transmitted through the nonoverhauling threaded member 359, bearings 399, 401 and overhauling threaded member 397. So long as these axial forces are insufficient to overcome the preloading of the springs 507 and 509, the axial forces will induce rotation in the overhauling threaded member 397 and its rigidly attached inertia member 481 to rotate the inertia member 481, threading the threads 393 onto the threads 395 and maintaining these members in synchronism. If, however, the axial force applied to the strut 479, combined with the rotary inertia of the inertia member 481, is sufficient to overcome the preload on either of the springs 507, 509, the overhauling nut 495 will be axially displaced relative the nonoverhauling threaded member 359. The relative movement of the nut 495 and nonoverhauling threaded member 359 will desynchronize the threads 393 and 395 so that engagement therebetween will occur, engaging in turn one end of the inertia member 481 and either the nut 387 or shoulder 375 to lock the strut 479. The springs 507 and 509 remain preloaded so that a removal of the excessive force on the strut 479 will again center the nut 495, rotating the inertia mass 481 to a synchronized position. Thus, in this embodiment, biased axial displacement of the motion sensing mechanism rather than biased rotational motion, as in the embodiment of FIGS. 1 through 7, is utilized to induce a desynchronization of the nonoverhauling threaded members.

Referring now to the embodiment of FIG. 10, it will be shown that the biased rotational motion used to sense acceleration in the embodiment of FIGS. 1 through 7 may be alternately sensed at the interconnection between the overhauling threaded member 397 and nonoverhauling threaded member 359. In this case, the locking strut is identical in configuration with the strut 479 shown in FIG. 9, the overhauling threaded member 397 rigidly attached to an inertia member 481 and supported by bearings 399, 401. The only change is the interconnection between this overhauling threaded member 397 and the nonoverhauling threaded member 359. Specifically, the overhauling nut 511 of this embodiment is maintained within the cavity 487 and axially positioned between a pair of thrust bearings 513 and 515, the thrust bearing 515 being positioned by an end cap 517 attached to the nonoverhauling threaded member 359 by multiple screws 519. The outer extremity of the nut 511 forms a rotating cup member similar to the cup member 421 of FIG. 1, including a cylindrical sidewall 521 having diametrically opposed slots 523 and 525. Aligned, axially extending slots 491 and 493, as in FIG. 9, are formed in a reduced diameter shoulder portion 489 in the cavity 487. A pair of preloaded circular springs 527 and 529, similar to the springs 441 and 443 of FIG. 1, include projecting radial tabs 531 and 533, respectively, which extend through the slots 523 and 525, respectively, to engage the slots 491 and 493, respectively, biasing the nut 511 to a predetermined rotational position relative the nonoverhauling threaded member 359. As in the embodiment of FIG. 1, the springs 527 and 529 are preloaded so that a predetermined rotational force is required to produce relative rotation between the nut 511 and the nonoverhauling threaded member 359. Either a standard overhauling nut 511 may be used in this embodiment or, preferably, a ball nut such as that described in reference to FIG. 8 may be used. As axial force is applied to the strut of FIG. 10, the overhauling threaded member 397 will turn within the overhauling nut 511, directly inducing rotation in the inertia member 481. When the force required to cause such rotation of the member 481 exceeds the preload of the springs 527 and 529, however, the nut 511 will turn within the cavity 487, permitting desynchronization of the nonoverhauling threads 393 and 395 to engage these threads, which engagement will prohibit further rotational motion of the inertia member 481 and thus lock the strut. Since the springs 527 and 529 remain biased against the nut 511 and shoulder 489, a reduction of the force on the locking strut will immediately cause a relative rotation of the nut 511 and nonoverhauling threaded member 359 induced by the springs 527 and 529 to again synchronize the nonoverhauling threads 393 and 395 and permit continued low acceleration motion of the locking strut.

A important feature of this invention is the fact that, once the motion threshold is exceeded, the overhauling threaded member 397 no longer bears the force causing this excessive motion. Rather, the inertia member 391 or 481 and first nonoverhauling threaded member 359 with their nonoverhauling threads 393 and 395 directly bear the force so that the overall strength of the apparatus can be substantially increased without increasing the diameter or strength of the overhauling threaded member 397.

In addition, the inertia members 391, 481 of this invention directly bear on the cavity within the telescoping member 323 so that large, flat bearing surfaces may be used to support the load of the locking strut without the interposition of roller or ball bearings which would substantially decrease the load bearing capacity of the strut by inducing stress concentrations in the apparatus.

In each embodiment, the end caps 327, 337 may be relatively rotated after installation of the device without desynchronizing the nonoverhauling threads, so that installation is facilitated. Furthermore, each embodiment includes springs which are preloaded, the degree of preloading predetermining the motion threshold which will cause the strut to lock. It can be seen from the numerous embodiments of this invention that permitted relative rotation between the overhauling threaded member 397 and inertia member 391 is equivalent in function to permitted axial motion between these members and is also equivalent to permitted rotational or axial motion between the overhauling threaded member 397 and the nonoverhauling threaded member 359, each providing a mechanism for sensing the axial or rotational force on the overhauling threaded member 397 for inducing the necessary rotation in the inertia member 391, 481, and desynchronizing the nonoverhauling threads 393, 395 when this force is exceeded.

As an added feature present in each of the embodiments of this invention, a mechanism is included for the purpose of prohibiting an internal jarring action within the motion arrestor when the arrestor reaches either extreme of its axial travel, which jarring could subject the arrestor to a permanent lock-up situation wherein the nonoverhauling threaded members become so tightly engaged that further low acceleration motion of the relatively movable members is prohibited.

Referring again to FIG. 1, a spring stop 482 is positioned within a circular cavity formed by an annular rim 484 extending beyond the end of the nonoverhauling threaded member 359. The spring 482 is retained within this cavity by a spring clip 486 biased radially outward into a conforming groove in the rim 485.

The spring 482 is identical in configuration to the springs 441 and 443 described previously and includes a partial circular segment extending between a pair of radially outward extending tabs 488 and 490. These tabs 488, 490 extend through an axially extending slot 492 in the rim 484 to a position closely adjacent the inside diameter of the inertia member 391. The spring 482 is preloaded, that is, in its relaxed configuration it has a diameter substantially larger than the diameter to which it is confined within the rim 484.

A pair of pins 494 and 496 extend through apertures in the inertia member 391, and typically are retained by an interference fit in these apertures. The heads of these pins 494, 496 extend beyond the inner surface of the inertia member 391 and are located in positions, both axially and tangentially, which will assure that the tabs 488 and 490 will contact these pins 494, 496 as the inertia member 391 threads to its extreme positions on the nonoverhauling threaded member 359.

Thus, for example, when the strut 321 reaches its extreme extended position, the nonoverhauling threaded inertia member 391 will be positioned relative the nonoverhauling threaded member 359 as shown in FIG. 1. If, when the strut 321 reaches this configuration, the interia member 391 is still rapidly rotating, the spring tab 490 will contact the head of the pin 494, overcoming the preload of the spring 482, and resiliently decelerating the inertia member 391 to a full stop. In the absence of the spring 482, a rigid stop member would have to be located within the strut 321 to prohibit further extension of the telescoping members 323 and 325. If, for example, a rigid stop were placed on the telescoping members 323, 325 themselves, when the strut 321 reaches full extension an abrupt deceleration of axial motion would occur, attempting to induce an abrupt deceleration of the inertia member 391 through the overhauling threaded member 397. Since the inertia member 391 cannot, under these conditions, be stopped abruptly due to its inertia, it will tend to overtravel, locking the threads 393 and 395, in some cases permanently. The spring member 482 thus alleviates jolts within the system and permits a direct resilient stopping of the rotating inertia member 391 when the strut 321 is fully extended.

Similarly, the pin 496 abuts the extending spring tab 488 when the strut 321 is in its fully contracted configuration, assuring that even if the inertia member 391 is spinning rapidly when full contraction is achieved, the inertia member 391 will be resiliently decelerated without locking the threads 393 and 395.

This feature is conveniently included in each of the embodiments of the present invention, and the pin 494 and spring 482 are shown, for example, in the embodiment of FIG. 8. Thus it will be seen that the interengaging, noncontacting, nonoverhauling threaded members themselves determine the limit of extension and contraction of the strut 21 through a resilient stop member which prohibits relative rotation between these members. Once the stop at either extremity has been engaged, any attempts to further extend or contract the strut 321 will desynchronize the threads 393 and 395, since the inertia member 391 can no longer be rotated by the springs 441 and 443. Therefore, even in this stopped configuration, the large forces to be supported by the strut 321 are still borne directly through the nonoverhauling threads 393 and 395, rather than an additional stop mechanism as has been utilized in such devices in the past.

What is claimed is:

1. A mechanism for arresting motion between first and second relatively movable objects, comprising:
   a first member axially and rotationally fixed on said first object;
   a second member axially and rotationally fixed on said second object;
   a rotating member directly interposed between said first and second members, said rotating member having surfaces for engaging said first and second members when motion between said first and second members is to be arrested but said surfaces normally having sufficient clearance from each of said first and second members to allow rotation thereof without interposed bearings; and
   means for rotating said rotating member in response to relative movement between said first object and first member and said second object and second member, said means transmitting only rotational forces to said rotating member and maintaining said clearance when said relative movement is below a predetermined motion threshold and being incapable of maintaining said clearance when said motion threshold is above said predetermined motion threshold.

2. A mechanism for arresting motion as defined in claim 1 wherein said rotating member and one of said first and second members are threaded onto one another.

3. A mechanism for arresting motion as defined in claim 2 wherein the threads of said rotating member and said one of said first and second members are nonoverhauling.

4. A mechanism for arresting motion as defined in claim 2 wherein the threads of said rotating member and said one of said first and second member interengage one another without contact to provide said clearance when said relative movement is below said predetermined motion threshold.

5. A mechanism for arresting motion as defined in claim 4 wherein said means for rotating maintains said threads of said rotating member and said one of said first and second members synchronized during rotation in order to maintain said clearance.

6. A mechanism for arresting motion as defined in claim 5 additionally comprising:
   means permitting rotation of said first and second objects without desynchronizing said synchronized threads.

7. A mechanism for arresting motion as defined in claim 1 wherein said rotating member comprises an inertia member for sensing the relative acceleration of said first and second members.

8. A mechanism for arresting motion as defined in claim 7 wherein said means for rotating comprises a resilient element for rotationally driving said rotating inertia member.

9. A mechanism for arresting motion as defined in claim 8 wherein said resilient element comprises a spring interconnected between said rotating inertia member and an overhauling lead screw connected to rotate said spring in response to movement between said first and second members.

10. A mechanism for arresting motion as defined in claim 1 additionally comprising:
    resilient stop means for limiting the rotation of said rotating member and thereby limiting the relative motion of said first and second members.

11. A motion controlling strut, comprising:
    a first telescoping member;
    a second telescoping member interconnected to telescope linearly relative to said first telescoping member;
    a rotating member having nonoverhauling threads mounted on said first telescoping member;
    a nonoverhauling threaded member mounted on said second telescoping member, the threads of said nonoverhauling threaded member intermeshed with the threads of said rotating member without contacting such threads;
    means for rotating said rotating member in response to relative linear movement of said first and second telescoping members to thread said rotating member onto said nonoverhauling threaded member; and
    stop means tangentially engaging between said rotating member and said nonoverhauling threaded member for prohibiting wedging of said nonoverhauling threaded member on said rotating member, said stop means being disengaged throughout a range of first predetermined relative linear positions of said first and second telescoping members regardless of the direction of relative telescoping of said first and second telescoping members, and being engaged between said rotating member and said nonoverhauling threaded member once said first and second telescoping members have reached a second predetermined relative linear position.

12. A motion controlling strut, comprising:
    a first telescoping member;
    a second telescoping member interconnected to telescope linearly relative to said first telescoping member;
    a rotating member having nonoverhauling threads mounted on said first telescoping member;
    a nonoverhauling threaded member mounted on said second telescoping member, the threads of said nonoverhauling threaded member intermeshed with the threads of said rotating member without contacting such threads;
    means for rotating said rotating member in response to relative linear movement of said first and second telescoping members to thread said rotating member onto said nonoverhauling threaded member; and
    stop means tangentially engaging between said rotating member and said nonoverhauling threaded member for prohibiting wedging of said nonoverhauling threaded member on said rotating member, said stop means being disengaged throughout a range of first predetermined relative linear positions of said first and second telescoping members regardless of the direction of relative telescoping of said first and second telescoping members, and being engaged between said rotating member and said nonoverhauling threaded member once said first and second telescoping members have reached a second predetermined relative linear position, said stop means comprising a spring, and said nonoverhauling threads on said rotating member and said nonoverhauling threaded member permitting said rotating member to move linearly relative to said second telescoping member, said linear motion permitting said spring to engage and disengage at both ends of said linear motion.

13. A motion controlling strut as defined in claim 12 wherein said spring is a torsional spring extending from said nonoverhauling threaded member to abut stops mounted on said rotating member.

14. A motion controlling strut as defined in claim 12 wherein said spring comprises a torsional spring selectively engaged between said rotating member and said nonoverhauling threaded member.

15. A mechanism for arresting motion between first and second relatively movable objects, comprising:
   a pair of telescoping members attached, respectively, to said first and second objects;
   means sensing a predetermined relative motion threshold of said pair of telescoping members, said means supporting an axial load on said telescoping members during changes in relative movement of said objects below said motion threshold;
   bearing means mounted on one of said telescoping members and said sensing means for supporting said axial load; and
   means responsive to said sensing means limiting the telescoping of said pair of members when said motion reaches said predetermined threshold, said limiting means independently supporting the load applied to said pair of members by said movable objects at said threshold and bypassing said bearing means to permit said mechanism to support said threshold load without the interposition of rolling bearing members, said limiting means permitting relative motion of said telescoping members when said load applied to said pair of members by said movable objects at said threshold has been reduced.

16. A mechanism as defined in claim 15 additionally comprises:
   means permitting relative rotation of said pair of telescoping members without affecting said sensing means.

17. An adjustable locking strut for permitting relative motion between first and second mechanical elements below a predetermined motion threshold and for prohibiting such relative motion above said predetermined threshold, comprising:
   a first nonoverhauling threaded member mounted in a fixed axial position on said first mechanical element, said first threaded member mounted for rotation about its axis relative said first mechanical element;
   a second nonoverhauling threaded member mounted rotationally and axially in a fixed position on said second mechanical element, the threads of said first and second threaded members being interengaged and formed with sufficient clearance to prohibit contact therebetween when the threads of said first threaded member are axially centered with respect to the threads of said second threaded member;
   means for rotating said first threaded member during relative motion of said first and second mechanical elements below said predetermined threshold and for thus maintaining said threads of said first threaded member axially centered with respect to the threads of said second threaded member, said means being inoperative above said predetermined threshold, said means including bearing means for bearing the force between said elements when said rotating means is operative; and
   means bypassing said bearing means for supporting the force between said first nonoverhauling threaded member and said first mechanical element exclusive of said bearing means when said rotating means is inoperative, said last mentioned means comprising interengaging flat contacting surfaces of said first threaded member and said first mechanical element.

18. The strut of claim 17 wherein said first mechanical element is tubular and said first threaded member is a tubular member rotatably mounted within said first element without the use of rolling bearings, the ends of said tubular threaded member forming said flat contacting surfaces.

19. A mechanical for arresting linear motion between a pair of mechanical elements above a predetermined motion threshold, comprising:
   an externally threaded member mounted on one of said pair of mechanical elements;
   inertia responsive motion sensing means for sensing a predetermined linear motion threshold of said pair of mechanical elements, said sensing means comprising:
      an internally threaded inertia member sized to fit around said externally threaded member, and mounted for free rotation on the other of said pair of mechanical elements, a tubular portion thereof providing substantially all of the inertia of said inertia member, said inertia member having threads which, when synchronized and interengaged with the threads of said externally threaded member, do not contact the threads of said externally threaded member, the threads of said inertia member and said externally threaded member arresting the motion of said mechanical elements when not synchronized; and
      means for rotating said internally threaded member in proportion to said linear motion;
   said rotating means maintaining the threads of said externally threaded member in synchronism with the threads of said inertia member only when said motion between said pair of mechanical elements is below said motion threshold;
   first means mounted on one of said pair of mechanical elements for covering said threads of said externally threaded member throughout the range of said linear movement;
   second means mounted on the other of said pair of mechanical element surrounding and protecting said internally threaded inertia means and cooperating with said first means to maintain axial alignment of said elements and said members during said linear motion; and said inertia member comprises a cylindrical member having end surfaces, one of said end surfaces cooperating with said other of said elements and the other of said end surfaces cooperating with said second means to receive the load applied to said elements above said threshold 20. A mechanical as defined in claim 19 additionally comprising:
   means permitting relative rotation of said pair of mechanical elements without desynchronizing said threads.

21. An adjustable locking strut for permitting relative motion between first and second mechanical elements below a predetermined motion threshold and for prohibiting such relative motion above said predetermined threshold, comprising:
   first and second telescoping members fixedly mounted on said first and second mechanical elements, respectively;
   a first nonoverhauling threaded member located within said first telescoping member and mounted in a fixed axial position on said first mechanical element, said first threaded member mounted for rotation about its axis relative said first mechanical element;
   a second nonoverhauling threaded member mounted rotationally and axially in a fixed position on said second mechanical element and located within said second telescoping member, the threads of said first and second threaded members being interengaged and formed with sufficient clearance to prohibit contact therebetween when the threads of said first threaded member are axially centered with respect to the threads of said second threaded member;
   means for rotating said first threaded member during relative motion of said first and second mechanical elements below said predetermined threshold and for thus maintaining said threads of said first threaded member axially centered with respect to the threads of said second threaded member, said means being inoperative above said predetermined threshold; and
   slidably keyed friction means permitting relative rotation between said first and second telescoping members without causing contact between the threads of said first and second threaded members.

22. An adjustable locking strut for permitting relative motion between first and second mechanical elements below a predetermined motion threshold and for prohibiting such relative motion above said predetermined threshold, comprising:
   a first nonoverhauling threaded member mounted in a fixed axial position on said first mechanical element, said first threaded member mounted for rotation about its axis relative said first mechanical element;
   a second nonoverhauling threaded member mounted rotationally and axially in a fixed position on said second mechanical element, the threads of said first and second threaded members being interengaged and formed with sufficient clearance to prohibit contact therebetween when the threads of said first threaded member are axially centered with respect to the threads of said second threaded member;
   means for rotating said first threaded member during relative motion of said first and second mechanical elements below said predetermined threshold and for thus maintaining said threads of said first threaded member axially centered with respect to the threads of said second threaded member, said means being inoperative above said predetermined threshold, said rotating means comprising:
      a spring connected to said first threaded member to rotate said first threaded member, said spring transmitting only rotational forces to said first threaded member and flexing in response to inertia forces generated by rotation of said first threaded member.

23. An adjustable locking strut as defined in claim 22 wherein said rotating means additionally comprises:
   a rotating member mounted for rotation on one of said first and second mechanical elements and connected to said spring; and
   means for rotating said rotating member in response to relative axial movement of said first and second mechanical elements.

24. An adjustable locking strut for arresting motion between first and second relatively movable objects comprising:
   a pair of tubular, telescoping strut members attached respectively to said first and second objects;
   a cylindrical inertia member rotatably mounted within one of said strut members without rolling bearings, the inertia member being axially confined in said one strut member with the end surfaces of the inertia member being close to surfaces on said one strut member but with sufficient clearance to permit free rotation;
   means within said inertia member for rotating said inertia member in response to relative movement between said first and second strut members, said means maintaining said clearance when said relative movement is below a predetermined motion threshold and permitting one of said end surfaces to engage a surface on said one of said strut members to receive an axial load applied to said strut when said motion is above said threshold, said rotating means supporting an axial force when said motion is below said threshold; and
   rolling bearing means for supporting said rotating means and for bearing said force when said motion is below said threshold, said rolling bearing means mounted to be bypassed by said axial load when said motion is above said threshold, said latter axial load being borne exclusive of said rolling bearing means.

* * * * *